United States Patent
McKinnon et al.

(10) Patent No.: US 7,601,321 B2
(45) Date of Patent: Oct. 13, 2009

(54) LASER PYROLYSIS METHOD FOR PRODUCING CARBON NANO-SPHERES

(76) Inventors: J. Thomas McKinnon, 635 Dewey Ave., Boulder, CO (US) 80304; Andrew M. Herring, 262 Bonanza Dr., Nederland, CO (US) 80466; Bryan D. McCloskey, 1221 S. Congress Ave., Austin, TX (US) 78704

( * ) Notice: Subject to any disclaimer, the term of this patent is extended or adjusted under 35 U.S.C. 154(b) by 624 days.

(21) Appl. No.: 10/545,254

(22) PCT Filed: Feb. 17, 2004

(86) PCT No.: PCT/US2004/004454

§ 371 (c)(1), (2), (4) Date: Aug. 10, 2005

(87) PCT Pub. No.: WO2005/023708

PCT Pub. Date: Mar. 17, 2005

(65) Prior Publication Data

US 2006/0137487 A1 Jun. 29, 2006

(51) Int. Cl.
*C01B 31/02* (2006.01)

(52) U.S. Cl. .................................. 423/445 R; 75/414
(58) Field of Classification Search ............. 423/445 R; 75/414

See application file for complete search history.

(56) References Cited

U.S. PATENT DOCUMENTS 4,536,358 A * 8/1985 Welsh et al. ................. 264/81
6,143,448 A 11/2000 Fauteux et al.

* cited by examiner

*Primary Examiner*—Stuart Hendrickson
(74) *Attorney, Agent, or Firm*—David Silverstein; Andover-IP-Law (57) ABSTRACT

The present invention encompasses methods and apparatus for creating metal nanoparticles embedded in a carbonaceous char, the conversion of an carbonaceous char with embedded metallic nanoparticles to graphite-encased nano-sized metal particles surrounded by char, the separation of the graphite encased metal particles from the char matrix, and the related preparation and isolation of carbon nanosphere materials with or without the enclosed metal nanoparticles, and the uses of such carbon nanospheres and graphite enclosed metal nanoparticles as supports and enhancers for fuel cell electrocatalysts and other applications.

35 Claims, 7 Drawing Sheets

LASER PYROLYSIS METHOD FOR PRODUCING CARBON NANO-SPHERES

CROSS-REFERENCE TO RELATED APPLICATIONS

This application claims the benefit of the filing date of international application PCT/US04/04454 filed Feb. 17, 2004, which claims the benfit of the filing date of U.S. Provisional Application Ser. No. 60/448,924 filed Feb. 22, 2003.

FIELD OF THE INVENTION

The present invention relates generally to the field of nanotechnology and specifically to improved methods for the synthesis of carbon nanoparticles. This invention provides a novel method for the laser pyrolysis production of relatively homogeneous samples of hollow carbon nanospheres, and related intermediate products, derived via template synthesis, mediated by metal salts, from a carbonaceous substrate, preferably cellulose char, an inexpensive and renewable precursor. Such nanospheres and related products have many potential uses, for example as blends in nanocomposites (e.g., in polymers and high temperature glasses), as catalyst supports, and as nanoreaction chambers. Such new carbon structures are particularly relevant to the optimization of fuel cell electrocatalyst supports.

BACKGROUND OF THE INVENTION

There is an immense interest in the fabrication of new carbon-based nanomaterials with highly curved graphitic structures. The interest in these materials stems from their unique structural, mechanical and electronic properties, and hence their potential for use in important commercial products. These materials, which include open and closed nanotubes, carbon onions and graphitic nanocones, are mostly synthesized, typically in low yield, via laser vaporization, resistive heating or arc discharge methods, usually under high vacuum. See, for example, Iijima, S. *Nature,* 1991, 354, 56; Ugarte, D. *Nature,* 1992, 359, 707; and Krishnan, A.; Dujardin, E.; Treacy, M. M. J.; Hugdahl, J.; Lynum, S.; Ebbesen, T. W. *Nature,* 1997, 388, 451, which literature references are incorporated herein by reference. Furthermore, the products of such conventional syntheses are often heterogeneous, typically being mixed with large amounts of undesirable materials and therefore being difficult or impossible to purify. See, for example, Georgakilas, V.; Voulgaris, D.; Vázquez, E.; Prato, M.; Guldi, D. M.; Kukovecz, A.; Kuzmany, H. *J. Am. Chem. Soc.* 2002, 124, 14318 which literature reference is incorporated herein by reference. New and improved methods for the fabrication of carbon nanoparticles would be especially welcome if they could produce samples of both high purity and yield from readily available, renewable, inexpensive and benign starting materials.

Cellulose is unique among biopolymers in that, when it is charred below 400° C. and above its decomposition temperature of 280° C., it produces an aromatic structure in which domains of polycyclic aromatic hydrocarbon (PAH) anneal during such a charring step into larger ensembles of five- and six-membered aromatic rings. See, for example, Herring, A. M.; McKinnon, J. T.; Petrick, D. E.; Gneshin, K. W.; Filley, J.; McCloskey, B. D. *J. Annal. Appl. Pyrol.* 2003, 66, 165, which literature reference is incorporated herein by reference. Other biopolymers, such as pectin, xylan and lignin, also produce chars containing aromatic structure, but these other biopolymers do not exhibit this PAH annealing behavior on charring to the same extent as does cellulose. The extensive hydrogen bonding network between the decomposing cellulose strands almost certainly plays an important role in this behavior. The decomposition of cellulose has been studied extensively, primarily for the purposes of understanding biomass energy processes, but cellulose has not previously been used for nanomaterial synthesis.

Nanoparticles previously have been produced from aromatic and PAH molecules and carbon soot, for example via catalyzed or templated routes. See, for example, Boese, R.; Matzanger, A. J.; Volhardt, K. P. C. *J. Am. Chem. Soc.* 1997, 119, 2052; Goel, A.; Hebgen, P.; Vander Sande, J. B.; Howard, J. B. *Carbon* 2002, 40, 177; Hou, H.; Schaper, A. K.; Weller, F.; Greiner, A. *Chem. Mater.* 2002, 14, 3990; Hu, G.; Ma, D.; Cheng, M.; Liu, L.; Bao, X. *Chem. Commun.* 2001, 8630; and, Gherghel, L.; Kübel, C.; Lieser, G.; Räder, H.,-J.; Müllen, K. *J. Am. Chem. Soc.* 2002, 124, 13130, which literature references are incorporated herein by reference. These methods are not well understood, but are strongly influenced by the presence or absence of either a catalyst or a template species. Similar structures, with a diameter of ca. 100 nm, have been prepared by annealing carbon onions, produced by autoclave reaction of NaCl and hexachloro benzene, at 1400° C. In these experiments, the NaCl is intercalated in the graphitic layers of the carbon onions, and the vaporization of this salt results in the larger hollow carbon nanospheres.

Thus, carbon nanoparticles prepared in various ways and with many morphological structures have existed prior to the current invention. The current technology in this field, however, is deficient or inadequate in one or more of the following ways:

1. Expensive processing operations to create the nanoparticle products.
 2. Expensive materials or catalysts required to create the nanoparticle products.
 3. Nanoparticle products are produced in low yields.
 4. Nanoparticle products are produced in low purity.
 5. Nanoparticle products are difficult or impossible to obtain in pure form.
 6. Nanoparticle products are not in the best morphological configurations for use in the desired applications.

These and other deficiencies in or limitations of the prior art are overcome in whole or at least in part by the apparatus and methods of this invention.

OBJECTS OF THE INVENTION

A principal object of the present invention is to provide improved methods and apparatus for synthesizing carbon nanospheres from a char substrate material.

A more specific object of the present invention is to provide a method to template cellulose char using nanoparticles of metal salts.

Another specific object of this invention is to produce and isolate metal salt nanoparticles from the char using mild oxidation.

Still another object of this invention is to convert the cellulose char encased metal salt particles into graphite encased metal nanoparticles.

Yet another object of this invention is to isolate the graphite encased nanoparticles from the char matrix.

Another object of this invention is to isolate the graphite shells of the nanoparticles as hollow carbon nanospheres.

Still another object of this invention is to use either the graphite encased metal nanoparticles or the hollow carbon nanospheres as supports for platinum or other precious metals or their alloys to form an electrocatalyst component for use in the membrane electrode assembly of a proton exchange membrane fuel cell.

These and other objects, advantages and benefits of this invention will be better understood from the following description read in conjunction with FIGS. 1-7.

SUMMARY OF THE INVENTION

Methods for synthesizing hollow carbon nanospheres from a metal salt-doped carbon-based substrate are provided wherein carbon nanospheres are prepared by pyrolyzing chars at high temperatures. The chars are doped with selected metals/metal salts which serve as templates for creating the nanospheres. The pyrolysis heating may take place using a laser, other intense light sources, or other energy sources capable of heating a solid to temperatures in excess of 2000 K. The size of the carbon nanospheres according to this invention may be optimized by adjusting the amount and type of metal catalyst used, the temperature, pressure, temperature ramp rate, and other conditions used to create the char; and the temperature, pressure, temperature ramp rate, and other conditions used to pyrolyze the char. The methods of this invention may also be used to create metal nanoparticles, which can be isolated from the carbonaceous material, and carbon nanospheres filled with metal, each of which has independent utility in various applications. The carbon nanospheres of this invention have various applications such as in fuel cell electrode supports, nanoreaction chambers, blending agents for polymers, and strengthening agents for high temperature glasses.

More specifically, the present invention provides improved methods and apparatus for synthesizing carbon nanospheres from a charable, carbonaceous substrate material. The char may be prepared from cellulose or other carbon substrate materials. In a preferred embodiment, metals preferably in the form of metal salts are added to the uncharred substrate in amounts ranging from about 1-99% by weight, more preferably about 10-50% by weight, most preferably about 15-35% by weight. These metals/salts are believed to help form nanometer-scale particles in the char. These nanometer-scale particles then serve as templates for creating the desired carbon nanospheres. Preferred metal salts for use in this invention are the salts of first row transition metals, e.g., the 3d transition metals, and particularly, the salts of Ti, V, Cr, Mn, Fe, Co, Ni and Cu. A specific example is nickel chloride. The nanospheres are formed by heating the specially prepared char substrate to very high pyrolyzing temperatures, on the order of about 2000 K or greater. In one preferred embodiment, the heat source for heating the char substrate is an infrared laser, but other heat sources may also be used effectively in practicing this invention.

After being formed during the high temperature pyrolysis step described above, the carbon nanospheres can be removed from the amorphous carbon that surrounds them, for example by digesting the amorphous material in concentrated nitric acid. The nanosphere structures formed in accordance with this invention are substantially if not totally resistant to attack by the acid. Transmission electron microscope (TEM) analysis of nanospheres formed in accordance with this invention shows that the samples are almost totally homogenous. That is, they are uniform in size (for example, about 30-40 nm in diameter) with very little or no foreign material. The present invention provides a means of manufacturing large quantities of such nanospheres having superior purity, homogeneity and other properties for relatively low cost compared with prior art techniques.

DETAILED DESCRIPTION OF PREFERRED EMBODIMENTS

The present invention is based on the novel discovery that the chemistry of charring carbonaceous substrate materials, particularly cellulose, can be modified in various surprising and advantageous ways by the addition of certain particular types of metals, e.g., in the form of metal salts, which can act as a template for the charring material. Furthermore, these metal particles embedded in the char have also been found to favorably influence the subsequent pyrolysis chemistry and allow the production of the desired carbon nanoparticle morphology. Finally, the intermediate production and isolation of the nano-sized metal templates (metal nanoparticles) in accordance with this invention is a further desired outcome.

Transition metals have been known previously for their efficient production of single- and multi-wall nanotubes. See, for example, Colomer, J. F.; Bister, G.; Willems, I.; Kónya; Fonseca, A.; Van Tendeloo, G.; Nagy, J. B. *Chem Commun.* 1999, 1343, which literature reference is incorporated herein by reference. In particular, the entire series of 3d transition metals, such as nickel, cobalt and iron, has been found to be particularly effective for their efficient production of single- and multi-wall nanotubes. In the following description of nanosphere formation in accordance with the techniques of this invention, nickel was selected as a preferred transition metal, but it will be understood that other similar metals can also be used with somewhat different results. The initial charring process (T<400° C.) produces amorphous carbon. This carbon becomes graphitic during the subsequent pyrolysis step of the invention (T>2000° C.). In a preferred embodiment, a laser is used as the heat source to rapidly pyrolyze the cellulose char and produce graphitic nanostructures. For example, carbon dioxide lasers can be operated in continuous wave mode to produce carbon nanotubes from graphite/bimetallic targets in accordance with this invention. See, for example, Maser, W. K.; Munoz, E.; Beito, A. M.; Martinez, M. T.; de la Fuente, G. F.; Naniette, Y.; Anglaret, E.; Sauvajor, J., 1. Chem. Phys. Lett. 1998, 292, 587, which literature reference is incorporated herein by reference, for a general description of carbon dioxide lasers. This method was adapted for purposes of this invention to enable easy scale up of the process using a continuously fed char stream of a suitable, previously prepared metal-doped char material in accordance with this invention.

Illustrative Char Production

Figure 1:
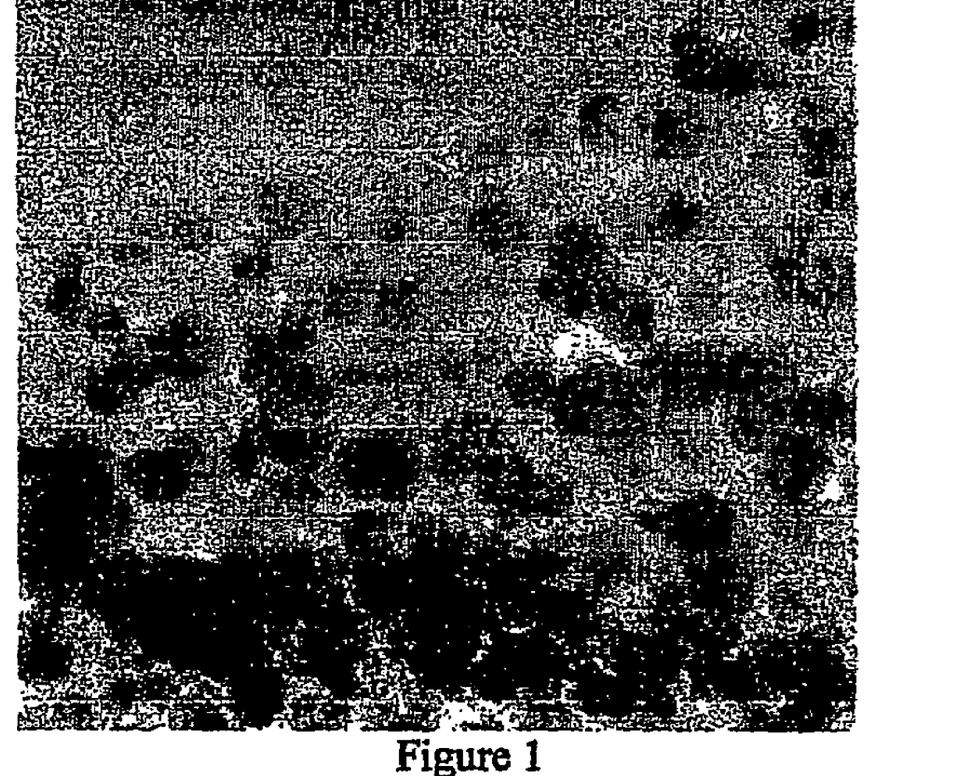
FIG. 1 shows a transmission electron microscope (TEM) image of a portion of a charred mixed nickel chloride/cellulose pellet wherein nickel chloride nanoparticles are surrounded by amorphous carbon.

The following description describes one exemplary technique for preparing a metal-doped char in accordance with this invention. To produce the char material, powdered cellulose (4 grams, brand name Avicel) was ground with nickel (II) chloride hexahydrate (1 gram) using an agate mortar and pestle until a fine powder was formed. The $NiCl_2.6H_2O$ was then dried in an oven at about 80° C. for at least one day before it was used for any of the subsequent experiments. The initial size of the powder particles was approximately 30 µm. Once the $NiCl_2$/Avicel mixture was prepared, it was allowed to sit in an 80° C. oven for at least one hour. The powdered mixture was then pressed in a 2.5 cm die at about 10,000 psi pressure for 30 seconds. The resulting solid pellet was then charred in a tube furnace at 375° C. for about 30 minutes using a 5-minute heat ramp procedure starting from ambient temperature until reaching 375° C. Charring occurred under an inert atmosphere (argon). The inert gas flowed through the 31 mm diameter charring tube at 13.3 $cm^3$/s. During the charring process, approximately 80% of the pellet mass was lost to the flowing gas as volatile compounds. After charring, the nickel in the pellet had formed crystallites of 10-20 nm in size surrounded by an amorphous carbonaceous material, as shown in the image of FIG. 1.

After charring, the pellet was allowed to cool in a glove bag under nitrogen for approximately 5-10 minutes before being mounted onto a spindle for the subsequent pyrolysis operation.

If metal nanoparticles are a desired end product, at least a first portion of the char material can be separated from the remaining second portion for this purpose. The metal nanoparticles may be separated from the carbonaceous material by treating the first portion with a mild oxidation in air. The DRIFTS of this char is very similar to that of undoped cellulose charred under identical conditions, with two exceptions. First, the $\nu(C=O)$ band, 1709 $cm^{-1}$, is reduced; and, second, anew sharp aromatic $\gamma(CH)$ band appears at 764 $cm^{-1}$ indicating that the aromatic ring structure is less substituted than in pure cellulose char. As expected, the XRD imaging pattern, shown in FIG. 4*a*, is representative of a mixture of $NiCl_2$ and amorphous carbon.

Illustrative Pyrolysis Process

At least a portion, e.g., the second portion, of the charred material produced according to the preceding illustrative char production process was laser pyrolyzed in a pyrolysis chamber using a carbon dioxide laser with a power of 58.5 W. The temperatures achieved by this heating process were in excess of the temperature of sublimation of anhydrous $NiCl_2$, i.e., 973° C. The pyrolysis chamber was evacuated and filled with argon twice before the pellet was laser pyrolyzed. At a pressure of 0.5 torr, the edge of the pellet was irradiated by a 20 W/$mm^2$ $CO_2$ laser beam while the pellet was spun by a stepper motor continuously at an angular velocity of 1.2 rev/min (which corresponds to a linear velocity at the edge of the pellet of about 1.63 mm/s). The pellet was allowed to complete one full revolution in the laser irradiation. Once the pyrolysis was completed, the pellet was taken out of the pyrolysis/combustion chamber and allowed to sit overnight in ambient conditions.

Figure 2:
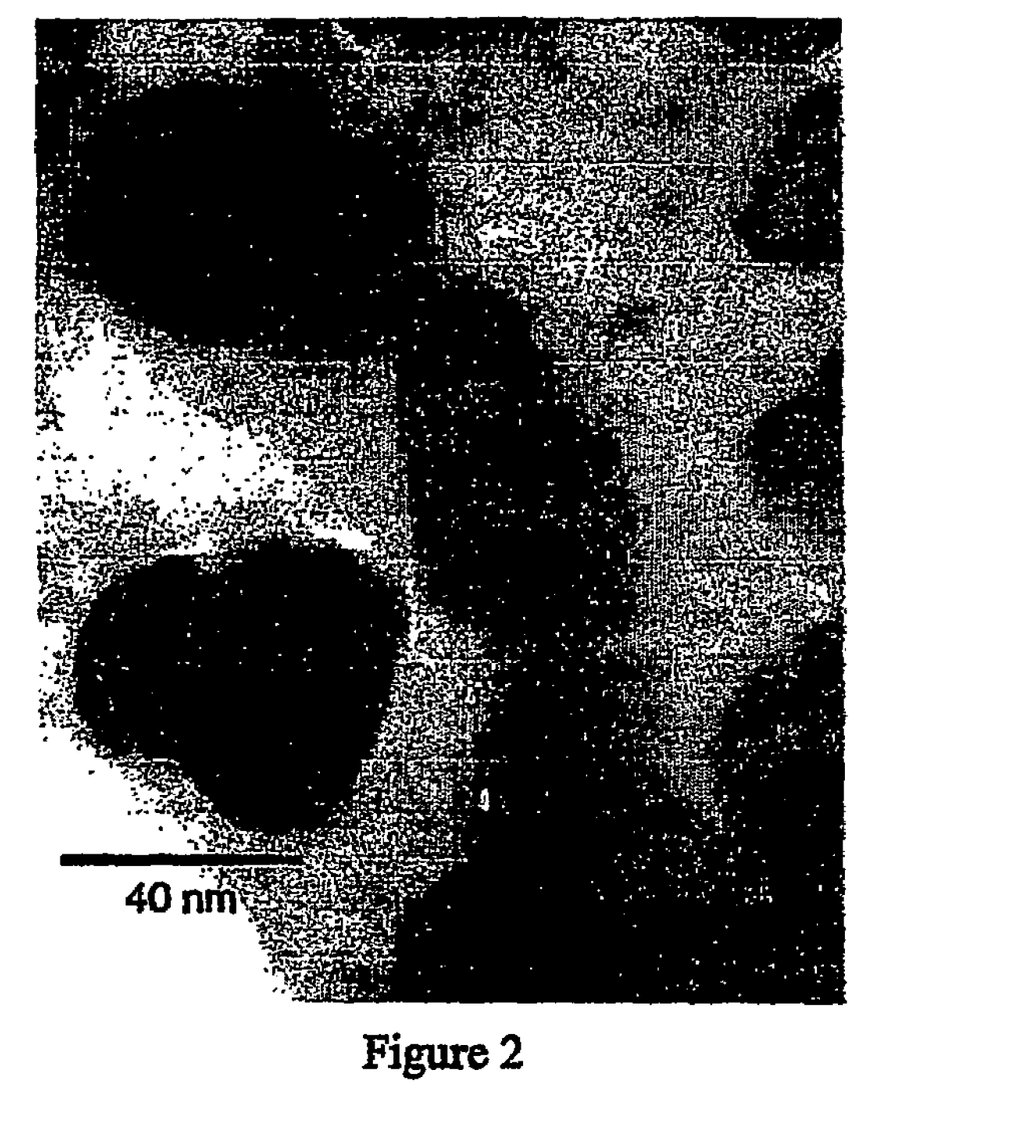
FIG. 2 shows the charred mixed nickel chloride/cellulose pellet of FIG. 1 after it has been subjected to a laser pyrolysis treatment in accordance with a preferred embodiment of this invention, illustrating that the nickel nanoparticles are now encased in graphite and are surrounded by amorphous carbon.

The major products from this reaction at lower laser powers of about 6.5 W, as detected by molecular beam mass spectroscopy, are HCl, CO and $CO_2$. The $NiCl_2$ is believed to be involved in an oxidation reaction with the amorphous oxygenated PAH producing carbon, Ni(0) and HCl; and, the CO and $CO_2$ are simply byproducts of pyrolysis of the char. At low laser powers of about 6.5 to about 50 W, this grey material was found to consist of amorphous carbon containing intercalated nickel. When the pyrolysis was carried out at a high laser power, e.g., 58.5 W, the solid material showed new peaks in the XRD imaging patterns, which seem to represent nickel metal and graphitic carbon as seen in FIG. 4*b*. Examination of the material by TEM imaging reveals 30 nm particles of pure Ni, each surrounded by a 5-10 nm shell of graphite as shown in FIG. 2. These Ni-graphite particles are surrounded by amorphous carbon.

In order to remove the amorphous carbon and isolate the nano-sized metal particles in accordance with this invention, the resultant material is subjected to a further purification treatment, for example by an acid digestion with refluxing concentrated nitric acid. To do this, the pellet was ground to as fine a powder as possible using a mortar and pestle. The ground pellet was placed in 20 ml DI water and sonicated for about 10 minutes in order to form a very fine powder. The ground pellet was then centrifuged and dried before it was placed in nitric acid. Digestion was completed while refluxing in concentrated nitric acid for 4 hours with continuous stirring using a stir bar. Once the 4 hour period was over, 20 ml of DI water was added to the nitric acid solution. To separate the desired metal particle end product from the nitric acid, the solution was filtered using a glass frit filter and washed with DI water until the effluent from the filter was no longer acidic (as indicated by litmus paper testing). The process yielded 100 mg of a black powder on drying.

Figure 3:
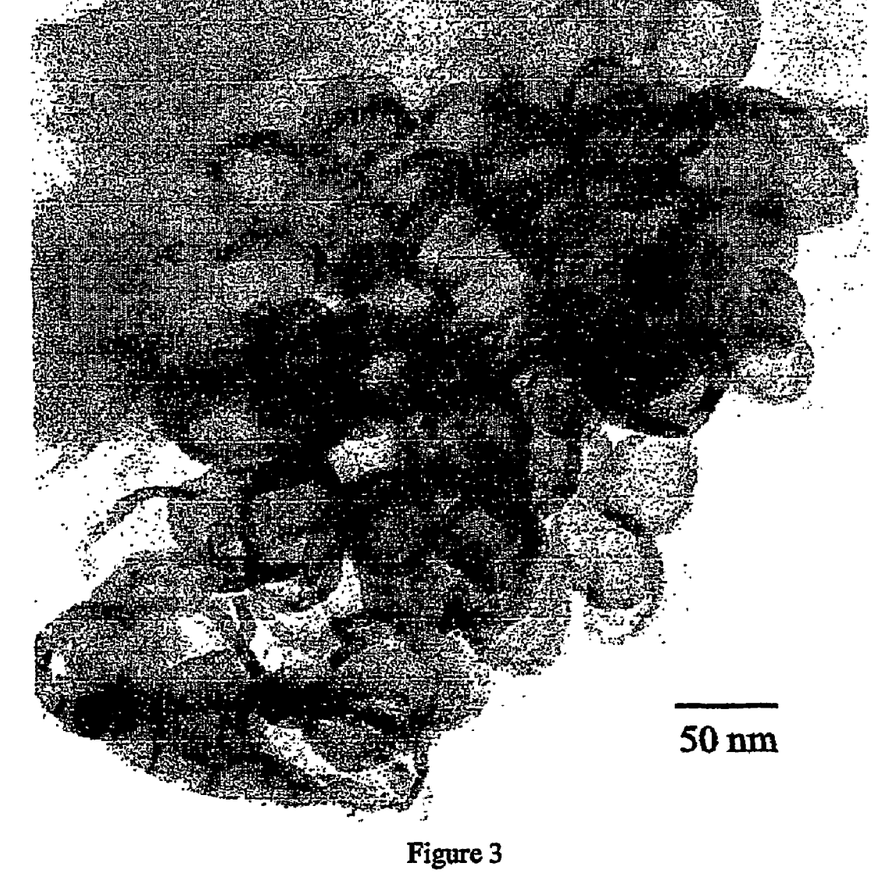
FIG. 3 shows hollow graphitic nanospheres formed in accordance with this invention.
Figure 4:
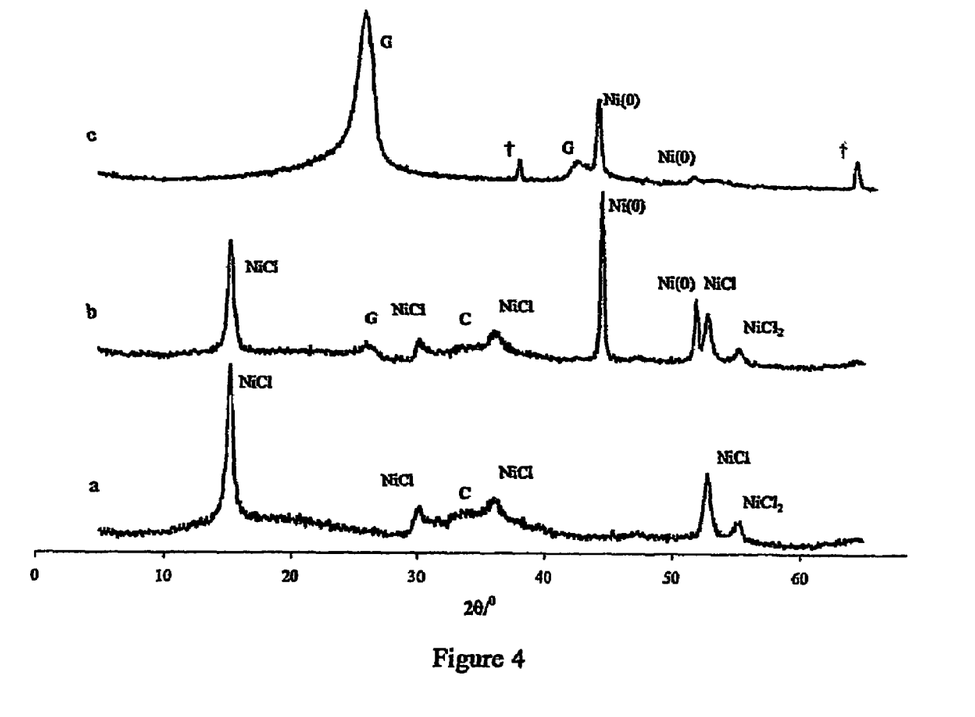
FIG. 4a shows an X-ray diffraction (XRD) image of a charred nickel chloride/cellulose pellet.
FIG. 4b shows an XRD image of a charred nickel chloride/cellulose pellet after a laser pyrolysis treatment in accordance with a preferred embodiment of this invention.
FIG. 4c shows an XRD image of a product sample prepared in accordance with this invention after a digestion/separation step, the product sample being composed primarily of hollow carbon nanospheres with some nickel nanoparticles and a small fragment of an unidentified phase.
Figure 5:
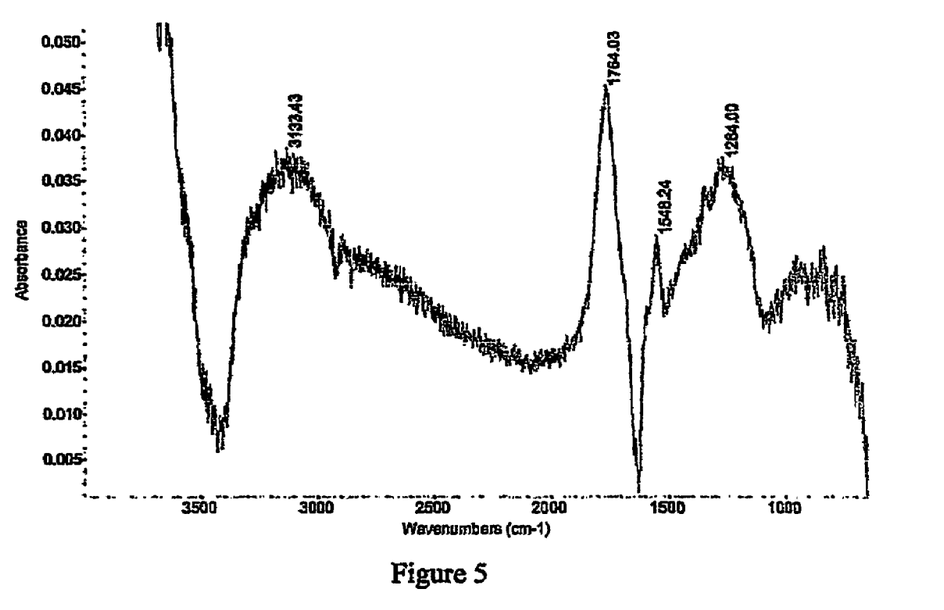
FIG. 5 shows a diffuse reflectance infrared spectrum of hollow carbon nanospheres formed in accordance with this invention showing some surface functionalization.

The SRD image of the black powder, as shown in FIG. 4*c*, was dominated by peaks assigned to graphitic carbon, some residual nickel metal, and a small amount of an as yet unidentified phase. Line width analysis of the XRD image using the Sherrer equation resulted in crystalline sizes for the graphite of 5.2 in and 29.4 nm for the nickel. Individual TEM imaging of multiple (more than 8) samples of this materials have all revealed extremely homogeneous samples of clumps of 40-50 nm diameter hollow carbon nanospheres, as shown in FIG. 3. The shells of the nanospheres have been determined to be composed of highly ordered layers of up to 60 concentric curbed graphitic sheets. The spacing of the graphite layers, 3.41 Å, correlates with a temperature of formation of 2250° C. See, for example, Mantel, C. *Carbon and Graphite Handbook*, Wiley and Sons, New York, 1968, which literature reference is incorporated herein by reference. The TEM imaging showed carbon nanospheres filled with nickel metal comprising approximately 1% of the sample. The DRIFTS of this material revealed weak features assigned to surface carbonyl and hydroxyl, 1764 and 3181 $cm^{-1}$, respectively.

Figure 7:
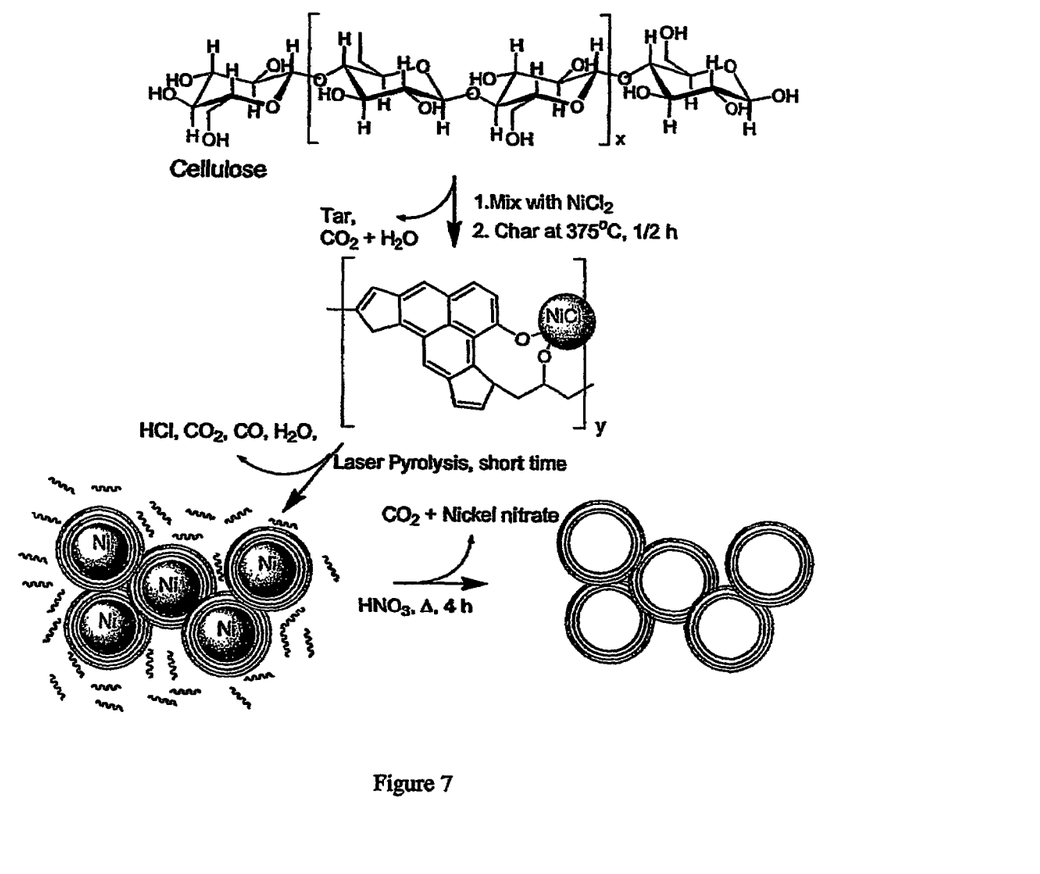
FIG. 7 illustrates the preparation of carbon nanospheres in accordance with this invention from nickel chloride doped cellulose.

Control experiments using pure Avicel cellulose but with no metal salts, charred in an identical way to the metal-doped material as described above, produced no insoluble material after nitric acid digestion. Clearly the nickel doping has affected the charring chemistry in some important way, it is believed by disrupting the hydrogen bond network of the char and templating the oxygenated-PAH domains, as seen in FIG. 7. The size of the carbon nanospheres thus produced depends on the size of the precursor $NiCl_2$ crystallites in the char. The size of the NiCl$_2$ crystallites can, in turn, be varied by changing the charring conditions also in accordance with this invention. Alternatively, different metal salts can be used to dope the pre-char carbonaceous material to also vary the size of the carbon nanospheres produced. These carbon nanospheres have been determined to be electrically conductive as well as to have functionalized peripheries.

Applications of Carbon Nanospheres

Because this invention results in the formation of novel and newly developed materials, the full scope of applications for the unique carbon nanospheres produced by the methods of this invention is not yet fully appreciated. Despite this uncertainty, it is believed that nanospheres produced in accordance with this invention will prove to be extremely useful in at least three technology areas: fuel cell electrode catalyst supports; high-temperature glass additives; and polymer blending agents.

Figure 6:
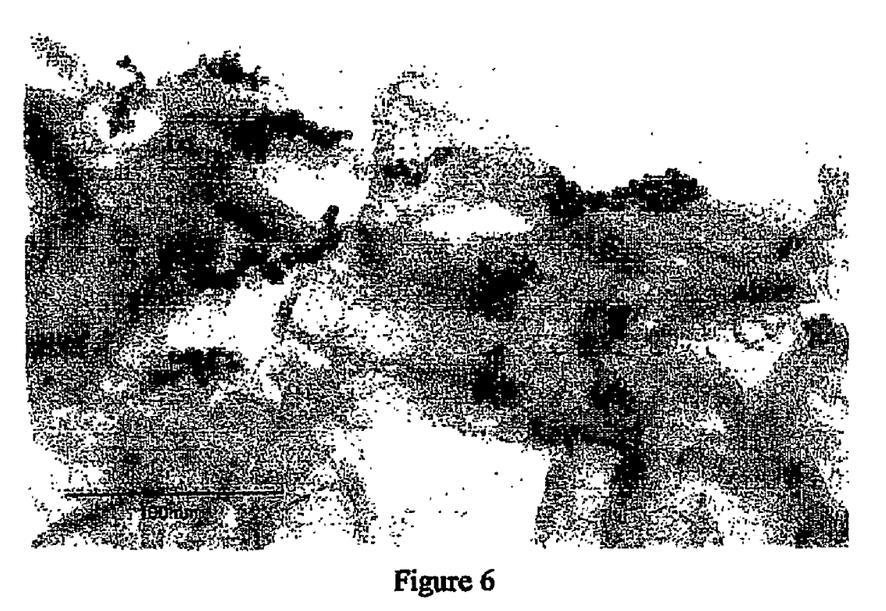
FIG. 6 shows platinum nanoparticles attached to hollow carbon nanospheres formed in accordance with this invention.

Fuel Cell Electrocatalyst Supports:

The electrocatalyst support of a PEM fuel cell must perform four separate operations. First, it must provide a means of efficiently dispersing the expensive platinum (or other precious metal) electrocatalyst, i.e., disperse the platinum in the smallest crystallites possible in order to maximize the effective surface area. Second, it must provide continuous bulk transport pathways for the fuel or oxidant to the electrocatalyst. Third, it must be electrically conductive to allow transport of the electrons. Finally, the electrocatalyst support must allow proton transport to the membrane. The properties of carbon nanospheres prepared in accordance with this invention allow the first three electrocatalyst support operations to be desirably carried out without additives. The simple addition of a proton conductor, such as Nafion, to an electrocatalyst support based on carbon nanospheres prepared in accordance with this invention thereby allows a nearly ideal electrocatalyst support to be formed. To create these materials, the surface of the nanosphere product was modified by a mild oxidation using 4M HNO$_3$ to convert the anhydride surface functionalities to carboxylic acid groups. The resultant black powder was refluxed with cholorplatinic acid in ethylene glycol for 6 hours followed by washing and drying in air. The TEM image of this electrocatalyst material is shown in FIG. 6.

High Temperature Stable Glasses:

Carbide and nitride based ceramic glasses (e.g., SiCN, SiOC, SiOCN) have shown the greatest potential for structural applications in high temperatures and harsh environments. Unfortunately, many of the carbides and nitrides processed through traditional powder consolidation and sintering are unstable in oxygen-containing environments due to passive and active oxidation. Polymer-derived carbide and nitride glasses, on the other hand, have shown excellent resistance to oxidation at temperatures up to 1450° C. Although the exact mechanism is not yet well understood, it is believed that free carbon incorporated into the glass network structure is inherently less prone to oxidation and corrosion than polycrystalline ceramics. The addition of hollow carbon nanospheres prepared in accordance with this invention provides a promising method to further enhance the properties of these glass compositions by introducing additional free carbon into the O-, N-based glasses in an effort to prevent crystallization at temperatures up to 1700° C. and yield a lightweight, creep-resistant, HT-stable glass.

Totally Renewable Nanocomposite Plastics:

The field of polymers produced from corn-based polylactic acid (PLA) is a rapidly exploding area both in terms of research and commercial interest. However, the current PLA materials have morphological and performance problems that must be addressed before they make widespread market penetration. Blending PLA plastics with carbon nanospheres prepared in accordance with this invention shows promise in both addressing the plastic performance issues and producing a material based entirely on renewable resources.

These and other important applications for the carbon nanosphere products and the nano-sized metal particles produced in accordance with this invention will be apparent to those skilled in the art, and all such uses and applications of the novel products of this invention are intended to be covered by the appended claims.

It will also be apparent to those skilled in the art that other changes and modifications may be made in the above-described apparatus and methods for pyrolysis of metal-doped carbonaceous chars for producing carbon nanospheres without departing from the scope of the invention herein, and it is intended that all matter contained in the above description shall be interpreted in an illustrative and not a limiting sense.

Having described the invention, what is claimed is:

1. A method for synthesizing hollow carbon nanospheres and nanometer-scale metallic particles from a carbon-based substrate doped with a metal salt, and for recovering either one or both of these products, comprising the sequential steps of:
   (a) doping a carbon-based substrate with about 1-99 wt. % of a metal salt;
   (b) heating the doped substrate in an inert gas atmosphere to a first heating temperature of about 200° C. to about 400° C. for a period sufficient to produce initial charring of the substrate to form amorphous carbon and metal nanoparticles;
   (c) cooling the charred substrate;
   (d) optionally separating a first portion of the charred substrate from the remaining charred substrate and recovering metal nanoparticles if desired from said first portion of the charred substrate; and,
   (e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid.

2. A method according to claim 1 wherein the metal salt is selected from the group consisting of the salts of transition metals.

3. A method according to claim 1 wherein the metal salt is selected from the group consisting of the salts of Ti, V, Cr, Mn, Fe, Co, Ni and Cu.

4. A method according to claim 1 further including the step of blending the carbon nanospheres with a high-performance plastic composition consisting essentially of polylactic acid (PLA).

5. A method according to claim 1 wherein the carbon-based substrate is doped with about 10-50 wt. % of a metal salt.

6. A method according to claim 1 wherein the metal salt is mixed with the carbon-based substrate in a weight ratio of about 1 part by weight of metal salt to about 4 parts by weight of carbon-based substrate.

7. A method according to claim 1 wherein step (e) is carried out using a laser at a laser power above about 50 W.

8. A method according to claim 1 wherein the carbon-based substrate is doped with about 15-35 wt. % of a metal salt.

9. A method according to claim 1 wherein substantially all of the charred substrate is subjected to the pyrolysis treatment of step (e).

10. A method according to claim 1 further including the step of dispersing a precious metal along surfaces of the carbon nanospheres.

11. A method according to claim 10 further wherein the precious metal is platinum.

12. A method according to claim 1 further including the step of blending the carbon nanospheres with a carbide and/or nitride-based ceramic material.

13. A method according to claim 1 further including the step of blending the carbon nanospheres with a high-performance plastic composition consisting essentially of polylactic acid (PLA).

14. A method for synthesizing hollow carbon nanospheres and nanometer-scale metallic particles from a carbon-based substrate doped with a metal salt, and for recovering either one or both of these products, comprising the sequential steps of:
(a) doping a carbon-based substrate with about 1-99 wt. % of a metal salt;
(b) heating the doped substrate in an inert gas atmosphere to a first heating temperature of about 200° C. to about 400° C. for a period sufficient to produce initial charring of the substrate to form amorphous carbon and metal nanoparticles;
(c) cooling the charred substrate;
(d) optionally separating a first portion of the charred substrate from the remaining charred substrate and recovering metal nanoparticles if desired from said first portion of the charred substrate; and,
(e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;
wherein the metal salt is nickel (II) chloride hexahydrate ($NiCl_2 \cdot 6H_2O$).

15. A method according to claim 14 further including the step of dispersing a precious metal along surfaces of the carbon nanospheres.

16. A method according to claim 14 further including the step of blending the carbon nanospheres with a carbide and/or nitride-based ceramic material.

17. A method according to claim 14 further including the step of blending the carbon nanospheres with a high-performance plastic composition consisting essentially of polylactic acid (PLA).

18. A method for synthesizing hollow carbon nanospheres and nanometer-scale metallic particles from a carbon-based substrate doped with a metal salt, and for recovering either one or both of these products, comprising the sequential steps of:
(a) doping a carbon-based substrate with about 1-99 wt. % of a metal salt;
(b) heating the doped substrate in an inert gas atmosphere to a first heating temperature of about 200° C. to about 400° C. for a period sufficient to produce initial charring of the substrate to form amorphous carbon and metal nanoparticles;
(c) cooling the charred substrate;
(d) optionally separating a first portion of the charred substrate from the remaining charred substrate and recovering metal nanoparticles if desired from said first portion of the charred substrate; and,
(e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;
wherein the carbon-based substrate is cellulose.

19. A method for synthesizing hollow carbon nanospheres and nanometer-scale metallic particles from a carbon-based substrate doped with a metal salt, and for recovering either one or both of these products, comprising the sequential steps of:
(a) doping a carbon-based substrate with about 1-99 wt. % of a metal salt;
(b) heating the doped substrate in an inert gas atmosphere to a first heating temperature of about 200° C. to about 400° C. for a period sufficient to produce initial charring of the substrate to form amorphous carbon and metal nanoparticles;
(c) cooling the charred substrate;
(d) separating a first portion of the charred substrate from the remaining charred substrate and recovering metal nanoparticles if desired from said first portion of the charred substrate; and,
(e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;
wherein at least a first portion of the charred substrate is cooled and subjected to a mild oxidation to separate metal nanoparticles from the carbonaceous material.

20. A method according to claim 19 wherein the metal salt is selected from the group consisting of the salts of transition metals.

21. A method according to claim 19 further including the step of dispersing a precious metal along surfaces of the carbon nanospheres.

22. A method according to claim 19 further including the step of blending the carbon nanospheres with a carbide and/or nitride-based ceramic material.

23. A method according to claim 19 further including the step of blending the carbon nanospheres with a high-performance plastic composition consisting essentially of polylactic acid (PLA).

24. A method for synthesizing hollow carbon nanospheres and nanometer-scale metallic particles from a carbon-based substrate doped with a metal salt, and for recovering either one or both of these products, comprising the sequential steps of:
(a) doping a carbon-based substrate with about 1-99 wt. % of a metal salt;
(b) heating the doped substrate in an inert gas atmosphere to a first heating temperature of about 200° C. to about 400° C. for a period sufficient to produce initial charring of the substrate to form amorphous carbon and metal nanoparticles;
(c) cooling the charred substrate;
(d) optionally separating a first portion of the charred substrate from the remaining charred substrate and recovering metal nanoparticles if desired from said first portion of the charred substrate; and,
(e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;

wherein the pyrolysis treatment utilizes a laser as the heat source to rapidly pyrolyze the metal-doped charred substrate.

25. A method according to claim 24 wherein the metal salt is selected from the group consisting of the salts of transition metals.

26. A method according to claim 24 further including the step of blending the carbon nanospheres with a carbide and/or nitride-based ceramic material.

27. A method for synthesizing hollow carbon nanospheres and nanometer-scale metallic particles from a carbon-based substrate doped with a metal salt, and for recovering either one or both of these products, comprising the sequential steps of:
   (a) doping a carbon-based substrate with about 1-99 wt. % of a metal salt;
   (b) heating the doped substrate in an inert gas atmosphere to a first heating temperature of about 200° C. to about 400° C. for a period sufficient to produce initial charring of the substrate to form amorphous carbon and metal nanoparticles;
   (c) cooling the charred substrate;
   (d) optionally separating a first portion of the charred substrate from the remaining charred substrate and recovering metal nanoparticles if desired from said first portion of the charred substrate; and,
   (e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;
      wherein step (e) is carried out using a carbon dioxide laser.

28. A method for synthesizing hollow carbon nanospheres and nanometer-scale metallic particles from a carbon-based substrate doped with a metal salt, and for recovering either one or both of these products, comprising the sequential steps of:
   (a) doping a carbon-based substrate with about 1-99 wt. % of a metal salt;
   (b) heating the doped substrate in an inert gas atmosphere to a first heating temperature of about 200° C. to about 400° C. for a period sufficient to produce initial charring of the substrate to form amorphous carbon and metal nanoparticles;
   (c) cooling the charred substrate;
   (d) optionally separating a first portion of the charred substrate from the remaining charred substrate and recovering metal nanoparticles if desired from said first portion of the charred substrate; and,
   (e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;
      wherein step (e) is carried out using an infrared laser.

29. A method for synthesizing hollow carbon nanospheres and nanometer-scale metallic particles from a carbon-based substrate doped with a metal salt, and for recovering either one or both of these products, comprising the sequential steps of:
   (a) doping a carbon-based substrate with about 1-99 wt. % of a metal salt;
   (b) heating the doped substrate in an inert gas atmosphere to a first heating temperature of about 200° C. to about 400° C. for a period sufficient to produce initial charring of the substrate to form amorphous carbon and metal nanoparticles;
   (c) cooling the charred substrate;
   (d) optionally separating a first portion of the charred substrate from the remaining charred substrate and recovering metal nanoparticles if desired from said first portion of the charred substrate; and,
   (e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;
      wherein step (e) is carried out using a plasma torch.

30. A method according to claim 29 wherein the metal salt is selected from the group consisting of the salts of transition metals.

31. A method according to claim 29 further including the step of blending the carbon nanospheres with a carbide and/or nitride-based ceramic material.

32. A method according to claim 29 further including the step of blending the carbon nanospheres with a high-performance plastic composition consisting essentially of polylactic acid (PLA).

33. A method for synthesizing hollow carbon nanospheres and nanometer-scale metallic particles from a carbon-based substrate doped with a metal salt, and for recovering either one or both of these products, comprising the sequential steps of:
   (a) doping a carbon-based substrate with about 1-99 wt. % of a metal salt;
   (b) heating the doped substrate in an inert gas atmosphere to a first heating temperature of about 200° C. to about 400° C. for a period sufficient to produce initial charring of the substrate to form amorphous carbon and metal nanoparticles;
   (c) cooling the charred substrate;
   (d) optionally separating a first portion of the charred substrate from the remaining charred substrate and recovering metal nanoparticles if desired from said first portion of the charred substrate; and,
   (e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;
      further comprising the steps of repeating steps (a) to (e) while varying the amount and type of metal dopant in the carbon-based substrate; the temperature, pressure, and temperature ramp-up rate in step (b); and the temperature, pressure and heating conditions in step (e), in order to form carbon nanospheres of different sizes and properties for particular applications.

34. A method for synthesizing hollow carbon nanospheres and nanometer-scale metallic particles from a carbon-based substrate doped with a metal salt, and for recovering either one or both of these products, comprising the sequential steps of:
   (a) doping a carbon-based substrate with about 1-99 wt. % of a metal salt;
   (b) heating the doped substrate in an inert gas atmosphere to a first heating temperature of about 200° C. to about 400° C. for a period sufficient to produce initial charring of the substrate to form amorphous carbon and metal nanoparticles;

(c) cooling the charred substrate;
(d) optionally separating a first portion of the charred substrate from the remaining charred substrate and recovering metal nanoparticles if desired from said first portion of the charred substrate; and,
(e) pyrolyzing at least a portion of the remaining charred substrate by heating it to a second heating temperature of 2000° C. or higher in an inert gas atmosphere for a period sufficient to produce graphitic nanostructures having the properties of being almost totally homogeneous and substantially resistant to attack by acid;

further comprising the step of purifying the carbon nanospheres produced in step (e), said step of purifying comprising an acid digestion step or a mild gas-phase oxidation step.

35. A method according to claim 34 wherein said step of purifying the carbon nanospheres comprises an acid digestion using concentrated nitric acid to digest amorphous material in the reaction product.

* * * * *